United States Patent [19]

Clark et al.

[11] Patent Number: 4,850,717
[45] Date of Patent: Jul. 25, 1989

[54] PROCESS SENSOR TUBE HAVING EROSION AND CORROSION RESISTANCE

[76] Inventors: Eugene V. Clark, 19801 Gresham, Northridge, Calif. 91324; George K. Sievers, 1110 Kenwood St., Burbank, Calif. 91506

[21] Appl. No.: 419,496
[22] Filed: Sep. 17, 1982
[51] Int. Cl.$^4$ ............ G01K 1/00; G01K 1/08
[52] U.S. Cl. ................... 374/208; 374/209
[58] Field of Search .......... 374/148, 208, 209, 158; 427/252, 253, 249; 116/208

[56] References Cited

U.S. PATENT DOCUMENTS

| 3,589,935 | 6/1971 | Brill-Edwards et al. | 427/252 |
|---|---|---|---|
| 3,780,584 | 12/1973 | Long et al. | 374/148 |
| 3,785,854 | 1/1974 | Baldi | 427/252 |
| 3,911,747 | 10/1975 | Sivyer | 374/148 |
| 3,923,552 | 12/1975 | Parris | 374/208 |
| 3,935,034 | 1/1976 | Hayes | 427/252 |
| 3,969,130 | 7/1976 | Bokros | 427/249 |
| 4,016,013 | 4/1977 | Bitzer et al. | 427/249 |
| 4,117,179 | 9/1978 | Jackson et al. | 427/252 |
| 4,137,768 | 2/1979 | Tushie et al. | 374/208 |
| 4,238,957 | 12/1980 | Bailey et al. | 374/209 |
| 4,352,840 | 10/1982 | Sievers | 427/252 |

Primary Examiner—William A. Cuchlinski, Jr.
Assistant Examiner—W. Morris Worth
Attorney, Agent, or Firm—Louis J. Bachand

[57] ABSTRACT

Process stream sensor tube apparatus adapted for sensing process conditions in a process stream having fine particulate and/or chemical erosive or corrosive agents, the apparatus (10) comprising the sensor tube (20) and a housing (12) therefor having its external surfaces conditioned against corrosive or erosive wear by a coating (26) comprising at least one carbide, boride, aluminide or silicide alloy of at least one of iron, nickel, or cobalt formed in situ locally at the housing external surface portion normally subject to erosive wear.

1 Claim, 1 Drawing Sheet

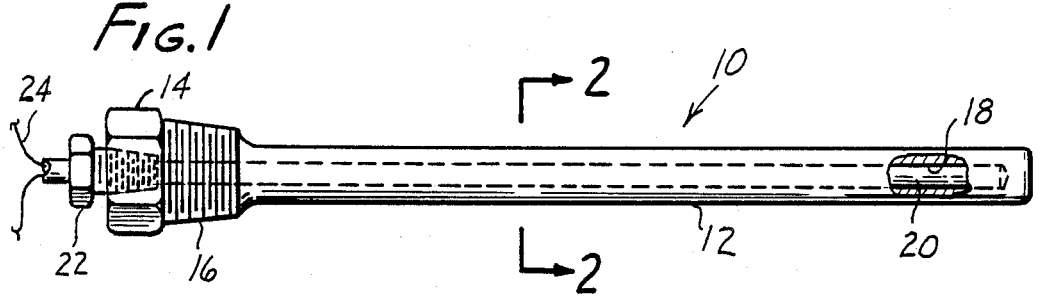
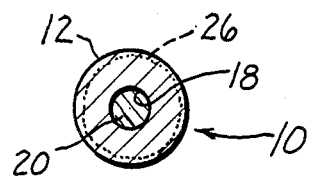
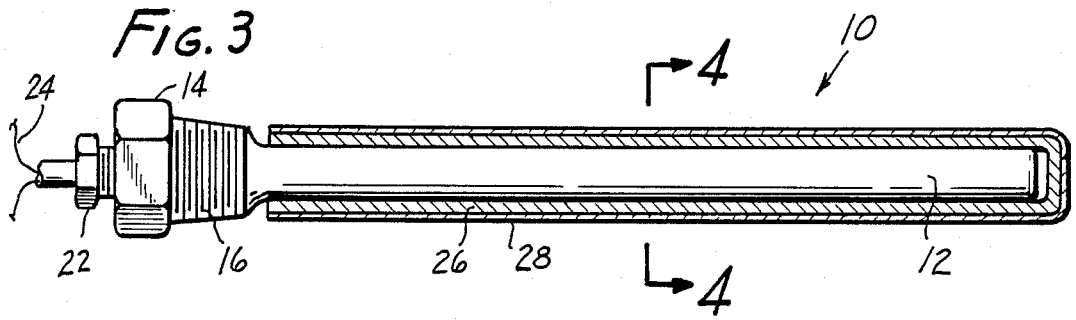
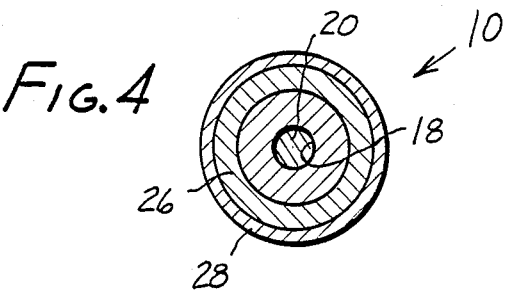

PROCESS SENSOR TUBE HAVING EROSION AND CORROSION RESISTANCE

TECHNICAL FIELD

This invention has to do with improved protection of process stream sensors. More particularly, the invention is concerned with increasing the erosion wear resistance and improving the corrosion resistance of the tubular housing normally enclosing such sensors, enabling longer life in severe usage applications such as the sensing of temperatures and flow rates in hydrocarbon process streams, e.g. in catalytic cracking operations. In such operations, particulates are often encountered which erode the sensor tube walls, lower chemical corrosion resistance, alter sensitivity and ultimately disable the sensor sensing element itself.

BACKGROUND ART

Process stream sensor tubes are typified by thermowells, apparatus comprising a bimetallic temperature sensing element and an enclosing generally tubular housing, which project into piping through which process streams are being passed, for the purpose of sensing conditions, temperature in the case of thermowells, which conditions are recorded directly or converted into data reflecting temperature related conditions, e.g. flow rates between a heat source and an adjacent thermowell may be determined from temperature readings at the thermowell. Such data is used as a record or processing conditions and used to alter process kinetics according to a predetermined set of operating parameters for the process.

These sensor housings typically comprise a steel alloy tube shaped with a closed end. In use, an appropriately coupled sensing element is inserted into the tube, the tube is cantilevered into the process stream-carrying piping, and data is collected. For sensitivity of measurement, the tubes must not be too thick-walled, but many process streams contain particulates which erode the tube walls over time, a process sometimes exacerbated by the presence of aggressive chemical agents in the stream. In addition, changing reaction conditions can result in wide temperature swings, subjecting the tube walls to contraction and expansion forces generally referred to as thermal shock, which further aggravates premature wear tendencies of the housing.

Improvements in the erosion and corrosion resistance of the sensor tubes will enable longer use life, and more accurate measurements during service. It is known to improve typical sensor tube alloys, such as a 316 stainless steel by depositing an erosion resistant plasma spray coating e.g. of chromium oxide or chromium nickel boride. These coating expedients are not thermal shock resistant owing at least in part to the fact that they are merely deposited onto and not integrated with the substrate material, and thus any improvement in erosion resistance is possibly lost during use of the tube, especially where temperature swings in use alternately contract and expand the housing wall, possibly at different expansion rates than the coating.

Erosive wear as the term is used herein refers to wear caused not so much by large particle abrasion as by innumerable minute contacts by the small particles that characterize fine particulate-containing liquid and vapor streams. It has been determined that mere hardness is not indicative of successful resistance to erosive conditions, although hardness is directly related to success in abrasion resistance.

Importantly, the erosion and corrosion resistance benefits conferred by the invention can be obtained locally in areas needing them, e.g. on the leading edge of the tube, or outward from the fittings which secure the tube to the piping wall, so that the entire part need not be fabricated of costly materials, nor coated entirely with a specialized coating.

DESCRIPTION OF THE INVENTION

It is therefore an object of the invention to provide a process stream sensor tube apparatus. It is another object to provide a process stream sensor tube apparatus having improved erosive and corrosive wear resistance. Another object is the provision of a process stream sensor tube of great erosion and corrosion resistance, in which the coating is so formed as to be integral with the tube walls, formed in situ in the surface of the wall, and greatly resistant to thermal shock. It is another object to provide a tungsten carbide composite sleeve carrying the erosion and corrosion resistant coating on the tube to further enhance wear and failure resistance, while maintaining sensitivity of measurement.

These and other objects of the invention to become apparent hereinafter are realized in a process stream sensor tube apparatus adapted for sensing conditions in process streams having erosive and/or corrosive fine particulate or chemical content, comprising an elongated sensing element adapted to project into the process stream, and a tubular housing therefore enclosing said sensing element in process stream sensing relation, the housing having its external surface conditioned process stream-engendered erosive or corrosive wear by a diffusion coating thereon comprising at least one carbide, boride, aluminide or silicide alloy with at least one of iron, nickel or cobalt, the alloy diffusion coating being formed in situ on said surface, whereby the surface is rendered highly resistant to erosive and/or corrosive stream action.

In particular embodiments, the housing is locally surface conditioned with iron carbide diffusion coating, an iron boride diffusion coating, a nickel or cobalt boride diffusion coating; an iron, nickel or cobalt aluminide coating, or an iron, nickel or cobalt silicide coating, and the housing is formed of steel, the diffusion coating being formed in situ on the housing steel external surface.

These and other embodiments of the invention can further include a separately formed external sleeve on the housing comprising a tungsten carbide composite with a matrix element such as cobalt or nickel, the sleeve defining the external surface on the housing and having a diffusion coating thereon comprising a single phase alloy of titanium, boron, carbon and composite matrix element, the alloy diffusion coating being formed in situ on the sleeve surface in housing protective relation.

Preferably, in accordance with the invention, the sensor tube housing comprises carbon steel or iron base stainless steel, the housing surfaces are coated with an erosion resistant coating comprising an inner layer of iron carbide and an outer layer of iron boride which is preferably iron carbide containing. Additionally, this and other coatings in acordance with the invention, typically range from 0.4 to 0.9 millimeter in depth, e.g. with a coating outer layer of iron boride where present ranging from 0.5 to 0.06 millimeter in depth.

In preferred embodiments of the present process stream sensor tube apparatus, the coating is formed by first diffusing carbon locally into the sensor housing surface, then diffusing boron from a diffusion pack at elevated temperatures and in the absence of oxygen, and thereafter quenching, to define an iron carbide layer outwardly relatively rich in iron boride as the coating.

The invention further contemplates a method of increasing the resistance to erosion and/or corrosion of process stream sensor tube housings, which includes forming carbides, borides, aluminides, or silicides of iron, nickel, or cobalt in situ in the housing surface, e.g. on the steel housing surface or on a tungsten carbide composite sleeve over said steel surface and defining the external surface of the housing, by diffusing respectively carbon, boron, aluminum and/or silicon into the surface from a diffusion pack thereof in the absence of oxygen and for a time and at a temperature sufficient to form said diffusion coating.

THE DRAWINGS

The invention will be further described as to an illustrative embodiment in conjunction with the attached drawings in which:

FIG. 1 is a side elevation view of the present sensor tube apparatus housing, partly broken away to show underlying parts;

FIG. 2 is a view in vertical section thereof, taken on line 2—2 in FIG. 1;

FIG. 3 is a view like FIG. 1, in which a protective sleeve is overfitted onto the apparatus housing; and FIG. 4 is a view like FIG. 2, taken on line 4—4 in FIG. 3.

PREFERRED MODES

The term "in situ" herein has reference to the formation of a coating within the original surface layer of the housing wall, as opposed to atop such wall as in conventional coating processes. The term "diffusion coating" describes the process by which in situ coatings are formed. The coating material, e.g. boron is physically diffused into the original housing wall surface by heating a diffusion pack comprising the boron to be diffused, a carrier such as a volatile halide, and an inert refractory such as aluminum oxide, to a temperature typically in excess of 1300° F. whereupon the boron permeates the housing wall surface forming intermetallic compounds with the elements in that surface, e.g. the iron constituent is converted to iron borides in the surface regions of the housing wall.

Turning now the drawings in detail, in FIGS. 1 and 2 a typical process stream sensor tube is shown at 10, and comprises e.g. a 410 stainless steel housing 12 of about 12 inches in length and ¾ inch in outside diameter. The housing 12 terminates inwardly in a fitting 14, tapped at 16, to accommodate the sensing element 20, which is inserted in the elongated bore 18 defined in the tube 10 and thread connected at 22. Sensor electrical leads 24 lead from the sensing element 20 to circuitry (not shown) adapted to respond to temperature dependent electrical changes in the sensing element.

In FIGS. 3 and 4 a second embodiment of the invention is shown. The tube 10 like that in FIGS. 1 and 2, but without an erosion resistant coating according to the invention is encased in a separately formed sleeve 26 comprising tungsten carbide composite bound with about 6% by weight of a cobalt matrix element. The sleeve 26 is provided with an erosion resistant coating 28 formed as described in Example 4 hereinafter and shown in exaggerated depth in FIGS. 3 and 4.

EXAMPLE 1

In accordance with the invention surfaces of the housing 12 likely to be subjected to erosive or corrosive wear are diffusion coated, preferably in a two step diffusion as follows:

Step 1

The areas to be conditioned are carburized. Carbon from a carbon source such as a commercial carburizing compound, or methane, is diffused into the desired areas by heating the area in contact with the carbon source, for a time, e.g. 5 hours and at a temperature, e.g. 1625° F., at which a subsurface carbon diffusion and formation of iron carbides to a suitable depth e.g. 0.4 to 0.9 millimeter, is realized. Since the tubular housing being conditioned is generally a steel part, e.g. iron base stainless steel, the iron carbides are formed in the treated surface locally and responsive to the carbon diffusion thereinto.

Step 2.

The area to be conditioned, now carburized, is then subjected to a boron diffusion under conventional conditions of time, temperature, and in an oxygen-free environment from a diffusion pack of per se known composition. For example, the part having the preformed iron carbide surface is immersed in a boronizing pack having typically the composition by weight:

Boron powder 2-10%;

Halogen activator sufficient to activate the pack;

Aluminum oxide, the balance. The pack is heated at 1650° F. for eight hours or until a diffusion of boron to a depth of about 0.5 to 0.06 millimeter is realized, the boron combining with the iron present in the part surface to form iron borides, in the presence of the iron carbides. Because of the sequencing of diffusion steps, the outer portion of the coating is relatively rich in iron borides, and the inner portion thereof comparatively richer in iron carbides. The iron carbides are present in the outer predominantly iron boride layer as well, or course. The part is then quenched.

The result of the foregoing steps is a sequential iron carbide-iron boride modification of the housing surface. The housing placed in a catalytic cracking process stream containing various molecular weight hydrocarbons at elevated temperatures, substantial quantities of sulfur compounds and acids, and considerable particulate, is both erosion and corrosion resistant to a high degree. In a typical installation the thus modified housing is at least twice as long lasting as the identical part without the foregoing coating, in terms of needing replacement, and is better protective of the sensing element within during its useful service life.

EXAMPLE 2

Example 1, Step 2, is duplicated but using a nickel/cobalt alloy structure as the housing. There is obtained a highly erosive wear resistant surface on the housing comprising nickel/ cobalt borides.

EXAMPLE 3

Example 1 is duplicated but using an aluminizing pack in lieu of the boronizing pack. The aluminizing pack contains about 5% by weight aluminum, a small but effective amount of a halide carrier, and the balance aluminum oxide. A comparable siliconizing pack can also be employed. The result of the stepwise diffusion is an erosion and corrosion resistant coating containing carbides, aluminides (and silicides as appropriate) and far superior to the underlying steel alloy in these important wear properties.

EXAMPLE 4

In another embodiment of the invention, the diffusion coated housing is jacketed in a highly abrasion resistant sleeve comprising a tungsten carbide composite with a cobalt matrix element. Nickel matrix element can be used as well. The separately formed sleeve is diffusion coated by the method of placing the sleeve in a diffusion pack comprising about 30% titanium as the active element, diffusing the titanium into the surface for about 10 hours at 1800° F., to destroy the tungsten carbide compounds, subsequently diffusing boron into the surface from a pack containing about 5% boron for about 10 hours at 1700° F. to form in the surface titanium diboride, cobalt boride and tungsten titanium boride in a single phase and thereby define a very hard external protective sleeve on the housing, which has been enhanced in erosion and corrosion resistance by the superaddition of the single phase alloys. The product of the method is shown in FIGS. 3 and 4 and includes housing 12, which terminates in a fitting 14, and is adapted to house a sensing element (not shown) terminating at 22 and having projecting leads 24 as in the FIGS. 1 and 2 embodiment. A tungsten carbide sleeve 26 overfits the housing 12. The inward portion of the sleeve 26 comprises tungsten carbide in a cobalt matrix; the sleeve has an outer portion 28 comprising the superhard, super erosion and corrosion resistant surface described above. Proportions of the housing and protective sleeve coating portion 28 have been exaggerated for purpose of clearer illustration.

In the foregoing examples all parts and percentages are by weight, unless otherwise indicated.

The housings of the present invention demonstrate exceptional resistance to wear by erosion, caused by innumerable low energy impacts of fine particulates with the surface areas. This result is unexpected in process stream sensor tube applications since there appears to be no known theoretical basis for predicting or explaining the improvement obtained. For example, conventional theories of support for a fragile coating as enhancing the performance of the coating would not seem to apply in the thermowell art where the impacts are minute, not heavy, and numerous, not infrequent. While not wishing to be bound to any particular theory, it is believed that the energy levels of the multitudinous impacts being low but continuous act to strip from the non-coated surface atoms needed to keep the surface from eroding, and the formation of the presently described coating blocks this action, effecting the noted improvements.

The role of the iron carbide in the present invention is not clear, since from a theoretical viewpoint its presence should not result in substantial improvement of the iron boride diffusion coating. But surprisingly, there is a remarkably beneficial effect on the erosion characteristic of the coating with the iron carbide preformation. For example the iron boride alone typically will last only 75% as long as the iron carbide/iron boride combination diffusion coating, in a like process stream sensor tube application. The iron carbide alone shows no improvement over the steel surface alone. A synergistic result therefore is obtained which was not predictable from a consideration of the component materials, prior to experimentation.

The invention thus provides a process stream sensor tube apparatus which operates longer, has fewer failures from erosion, and which is an improved product over this type of product as previously known.

We claim:

1. Process stream sensor tube apparatus adapted for sensing conditions in process streams having erosive and/or corrosive fine particulate or chemical content, comprising an elongated sensing element adapted to project into said process stream, and a tubular housing therefor enclosing said sensing element in process stream sensing relation a coating being formed by first diffusing carbon locally into said sensor housing surface, then diffusing boron from a diffusion pack at elevated temperatures and in the absence of oxygen, and thereafter quenching, to define an iron carbide layer outwardly relatively rich in iron boride as the coating.

* * * * *